United States Patent
Bachorski

(10) Patent No.: US 10,207,640 B2
(45) Date of Patent: Feb. 19, 2019

(54) METHOD AND SYSTEM FOR A WARNING MESSAGE IN A VEHICLE

(71) Applicant: VOLKSWAGEN AG, Wolfsburg (DE)

(72) Inventor: Tomasz Bachorski, Wendeburg (DE)

(73) Assignee: VOLKSWAGEN AG (DE)

( * ) Notice: Subject to any disclaimer, the term of this patent is extended or adjusted under 35 U.S.C. 154(b) by 114 days.

(21) Appl. No.: 14/974,984

(22) Filed: Dec. 18, 2015

(65) Prior Publication Data

US 2016/0214531 A1   Jul. 28, 2016

(30) Foreign Application Priority Data

Jan. 28, 2015   (DE) .................. 10 2015 201 456

(51) Int. Cl.

| | |
|---|---|
| *B60Q 9/00* | (2006.01) |
| *B60K 28/06* | (2006.01) |
| *B60W 50/16* | (2012.01) |
| *B60K 35/00* | (2006.01) |
| *B60W 50/14* | (2012.01) |

(52) U.S. Cl.
CPC .............. *B60Q 9/00* (2013.01); *B60K 28/066* (2013.01); *B60K 35/00* (2013.01); *B60W 50/16* (2013.01); *B60K 2350/96* (2013.01); *B60W 2050/143* (2013.01); *B60W 2050/146* (2013.01); *B60W 2540/26* (2013.01)

(58) Field of Classification Search
None
See application file for complete search history.

(56) References Cited

U.S. PATENT DOCUMENTS

| | | | | |
|---|---|---|---|---|
| 8,390,440 | B2 * | 3/2013 | Krautter ................. | B60K 35/00 340/435 |
| 2003/0181822 | A1 * | 9/2003 | Victor .................... | A61B 3/113 600/558 |
| 2006/0265126 | A1 * | 11/2006 | Olcott .................... | B60K 35/00 701/400 |
| 2012/0075122 | A1 * | 3/2012 | Whitlow ................. | A61B 5/18 340/963 |
| 2014/0195096 | A1 * | 7/2014 | Schliep ................... | G06F 3/011 701/29.1 |
| 2016/0009175 | A1 * | 1/2016 | McNew ............. | H04N 13/0484 340/438 |

(Continued)

FOREIGN PATENT DOCUMENTS

| | | |
|---|---|---|
| DE | 102004005816 A1 | 9/2005 |
| DE | 102005051539 A1 | 9/2006 |

(Continued)

*Primary Examiner* — Brian A Zimmerman
*Assistant Examiner* — Sara B Samson
(74) *Attorney, Agent, or Firm* — Barnes & Thornburg LLP

(57) ABSTRACT

A process for adaptive output of a warning message in a vehicle with at least one output unit. A driver-assistance system of the vehicle generates a warning signal for output of the warning message and transmits this signal to a control unit. At least one capture unit captures data about the direction of attention of the driver of the vehicle and transmits the captured data to the control unit. The control unit generates, as a function of the captured data about the direction of attention of the driver, an output signal for output the warning message by the at least one output unit. Also disclosed is a system for executing the process and a vehicle having the disclosed system.

13 Claims, 2 Drawing Sheets

(56) References Cited

U.S. PATENT DOCUMENTS

2016/0082960 A1\* 3/2016 Slaton ................. B60W 30/143
                                                           701/93

FOREIGN PATENT DOCUMENTS

| DE | 102007025530 A1 | 12/2008 |
| DE | 102007045932 A1 | 4/2009 |
| DE | 102008042521 A1 | 4/2010 |
| DE | 102009034068 A1 | 5/2010 |
| DE | 102009008142 A1 | 8/2010 |
| DE | 102010027449 A1 | 1/2012 |
| DE | 102010052293 A1 | 5/2012 |
| DE | 102012025032 A1 | 6/2014 |
| DE | 102013012470 A1 | 1/2015 |

\* cited by examiner

METHOD AND SYSTEM FOR A WARNING MESSAGE IN A VEHICLE

PRIORITY CLAIM

This patent application claims priority to German Patent Application No. 10 2015 201 456.8, filed 28 Jan. 2015, the disclosure of which is incorporated herein by reference in its entirety.

SUMMARY

Illustrative embodiments relate to a process for adaptive output of a warning message in a vehicle with at least one output unit. Illustrative embodiments also relate to a system for adaptive output of a warning message in a vehicle with at least one output unit, wherein a warning signal for output of the warning message can be generated by means of a driver-assistance system of the vehicle. In addition, illustrative embodiments relate to a vehicle with the disclosed system.

BACKGROUND

As a result of the increasing development of electronic driver-assistance systems and their integration into motor vehicles, the safety of the vehicle is being enhanced and the burden on the driver is being reduced. Examples are the anti-lock braking system, the electronic stability program and the spacing-regulated cruise control. Driver-assistance systems are able to intervene in the control of the vehicle with various degrees of automation: whereas with the lowest degree of automation merely prompts are indicated and the driver alone influences the motion of the vehicle, for instance by actuating the pedals or the steering wheel, with a higher degree the driver-assistance system intervenes supportively in devices of the vehicle. For example, the steering or the acceleration of the vehicle is influenced in the positive or negative direction. With the highest degree of automation a route is traversed substantially automatically, for example, or the locking of the wheels in the course of the braking procedure is prevented fully automatically.

With increasing degree of automation the driver-assistance system undertakes more and more automatic interventions. This is of particular significance when a critical situation is recognized and the system intervenes in the control of the vehicle. For instance, the spacing-regulated cruise control can reduce the speed of the vehicle to adapt the spacing to a vehicle cutting in. Furthermore, an emergency stop can be triggered, for example ahead of an obstacle suddenly appearing, or an automatic evasive maneuver can be carried out. The reaction triggered by a driver-assistance system may in these cases be effected distinctly more quickly than the driver himself/herself is able to grasp the situation and initiate countermeasures. In this connection, care has to be taken, in the interest of ride comfort and safety, to ensure that the driver is not surprised by the behavior of the vehicle and possibly reacts rashly. Therefore a warning is ordinarily output before or during the automatic intervention. The output of the warning message may, for example, be effected by a warning message in the instrument cluster of a motor vehicle, or by a warning tone.

In this connection it is to be noted that, depending on the driving situation, the attention of the driver may have been tied down in various ways, for instance, by unclear traffic events or by the manipulation of a device in the vehicle. The warning, therefore, has to be output in such a way that the driver registers it quickly, even if at this moment his/her attention is not directed directly towards the hazardous situation.

BRIEF DESCRIPTION OF THE DRAWINGS

Disclosed embodiments will now be explained in detail with reference to the drawings.

DETAILED DESCRIPTION OF THE DISCLOSED EMBODIMENTS

Figure 1:
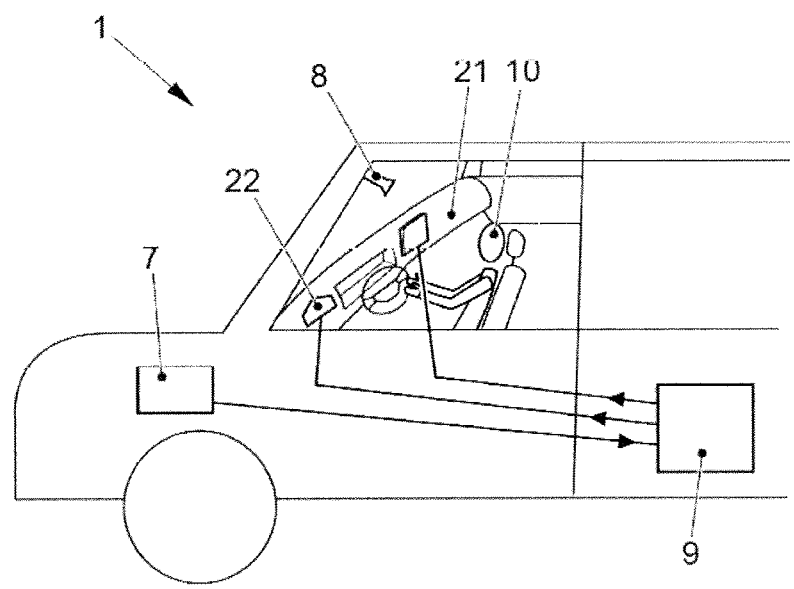
FIG. 1 shows schematically a disclosed embodiment of the vehicle, which includes a system by which the disclosed process is implemented.

Disclosed embodiments provide a process and an apparatus of the aforementioned type, by which it is ensured that a warning message can be registered quickly by the driver.

In the case of the disclosed process, a driver-assistance system of the vehicle generates a warning signal for output of the warning message, and transmits the signal to a control unit. At least one capture unit captures data about the direction of attention of the driver of the vehicle, and transmits the data likewise to the control unit. The control unit generates, as a function of the captured data about the direction of attention of the driver, an output signal for output of the warning message by means of the at least one output unit.

Accordingly, prior to the output of the warning message firstly data are captured concerning the direction in which the attention of the driver is directed. The evaluation of these data permits the control unit to generate the output signal in such a way that the warning message that is output can be optimally registered and understood by the driver. For example, a visual warning can be output on a display onto which the attention of the driver is presently directed, or an acoustic warning, for instance, can be output if no display is located in the field of vision of the driver. Furthermore, the warning message itself can be adapted, for instance by the indication of a more conspicuous warning message, if the attention of the driver is not directed directly onto a display. In this way, it is ensured that the driver registers the warning message quickly.

In at least one disclosed embodiment, the vehicle includes a plurality of output units, and the output signal is generated as a function of the data about the direction of attention of the driver in such a way that the warning message is output by means of one or more output units that have been assigned to the current direction of attention of the driver. In this case, those output units can be selected from a plurality which, in view of the direction of attention of the driver, are optimally suited for the registration of the warning message by the driver. In a vehicle several displays, for instance, may be present. If it is established that the attention of the driver is directed onto one thereof, a warning message can be indicated here, whereas the other displays remain unchanged. Furthermore, the warning message can be indicated at the same time on several displays situated closely together if the direction of attention of the driver cannot be captured sufficiently accurately or cannot be assigned unambiguously to one of the displays. The accuracy of the capture of the direction of attention can be adapted to the warning signal: for example, a warning with very high urgency can be output by means of all the output units simultaneously to warn the driver reliably, for instance in the case of full braking. In the case of warnings with lesser urgency, an individual one of several output devices can be selected precisely on the basis of the data about the direction of attention of the driver.

In at least one disclosed embodiment, the warning message is output before or during an automatic intervention of the driver-assistance system in the control, in particular in the motion of the vehicle. Such an automatic intervention may be, for instance, a decelerating of the vehicle if a vehicle cutting in with little decency changes onto the driver's own lane and the spacing-regulated cruise control re-establishes the safety spacing. In this case it is particularly important that the driver perceives the warning message quickly. If this automatic retardation occurs unexpectedly, the driver may be frightened. Another example is an automatic adaptation of the control in the course of the parking procedure. If, for instance, the steering lock is influenced here in the positive or negative direction, the vehicle is no longer complying directly with the values set by the driver. To avoid confusion over this, the intervention has to be pointed out to the driver. The disclosed process ensures that in the course of the intervention of the driver-assistance system the warning message is indicated in such a way that it immediately attracts the driver's attention.

In a further disclosed embodiment, the warning signal is output before or while a change of velocity is carried out by the driver-assistance system. By 'velocity' in this connection, both the magnitude of the velocity and the direction of the velocity are understood. The output signal is furthermore generated, in particular, as a function of the direction of the change of velocity. In this case the change of velocity may be effected along or transverse to the direction of travel. For example, such an intervention may be the automatic alteration of the direction of travel in the course of an evasive maneuver, or may be a braking procedure. In the course of such automatic interventions in the acceleration of a vehicle it is particularly important that the driver registers a warning quickly and directs his/her attention towards potential danger zones, for instance towards a region into which the vehicle is moving. For example, the driver-assistance system may carry out a change of lane in the course of an automatic overtaking maneuver. In this case the driver must attentively observe the lane onto which the car is being steered, and ensure that no collision occurs with another vehicle located there. A spacing-regulated cruise control can reduce the speed of the vehicle if another vehicle cuts in front of it with barely sufficient spacing, and the driver has to check whether an appropriate safety spacing is attained.

Such automatic measures may be surprising for the driver particularly when he/she is presently directing his/her attention in another direction. If, for example, the driver is looking to the right or if he/she is busy with the adjustment of the air-conditioning system while an obstacle appears ahead of the vehicle, the driver-assistance system can initiate a braking procedure before the driver himself/herself registers the obstacle. The configuration of the disclosed process ensures that the warning message is indicated to the driver in such a way as to be capable of being registered quickly and reliably.

According to at least one disclosed embodiment, the captured data about the direction of attention of the driver of the vehicle include the line of sight of the driver. Such a capture device that captures the line of sight may comprise a camera which provides image data from the head of the driver and permits a capture of position and direction of the head or of the eyes. In this connection the camera may have been permanently arranged in the vehicle, but it may also, for example, have been integrated into a mobile user apparatus, for instance smart glasses that the driver is wearing on his/her head. The captured data about the line of sight of the driver provide information about the attentiveness of the driver. If, for example, it is established that the gaze of the driver is directed onto a certain indicator on the dashboard, the warning message can be output on this indicator. If, on the other hand, the driver is directing his/her gaze not onto an indicator but, for instance, onto the roadway, a warning tone, for example, can be output. Consequently the direction of attention of the driver can be captured quickly and reliably.

In a further disclosed embodiment of the process, the captured data about the direction of attention of the driver of the vehicle include the operating state of at least one vehicle device. If, for example, the hand of the driver touches a touch-sensitive surface of a display (a so-called touch-screen), or the driver is operating another control element, the intention of the user to execute an input can be inferred. In this case the attention of the user is directed onto the input device. Also shortly after an input has taken place, the driver is still directing his/her attention onto the vehicle device. In this case the warning message can be output by means of an assigned output device. In the case of a touch-screen, this is habitually the display, on the surface of which the use input is undertaken. In the case of other control elements, for example a regulator for the air-conditioning system, this is frequently a display on the dashboard, on which the set values are indicated. In this way, the output unit onto which the user is presently directing his/her attention is recognized, and the warning message is output correspondingly.

In at least one disclosed embodiment, the capture unit captures the approach to a device of the vehicle by means of a spatially resolving proximity capture. Such a proximity capture may be a camera, on the basis of the data of which the position of, for instance, the hand of the driver is tracked, a light-barrier or a capacitive sensor that captures the approach of, for instance, the hand of the driver to a device. In this way, a manipulating intention, and hence the direction of attention of the driver, can be recognized whenever he/she approaches an input apparatus. The same applies to other devices of the vehicle, for instance a flap or door which the driver opens. The proximity to a device permits a reliable determination of the direction of attention of the driver.

In at least one disclosed embodiment, signals are generated by means of the control unit in such a way that the warning message is output so as to be visually, acoustically and/or haptically perceptible. The warning message may be visually perceptible, for example by virtue of an indication on various displays, or by flashing of warning lights in the vehicle. Furthermore, an acoustic warning may be output, for example as a beep or as spoken language. A haptically perceptible warning message—for instance, a jerky, brief acceleration or retardation of the vehicle—can also direct the attention of the driver quickly towards a critical situation. An output of the warning by several output devices that are capable of being perceived in various ways can also make the warning message capable of being registered better by the driver. The exploitation of various sensory channels, and their combination, can increase the effectiveness of a warning and the rapidity of the registration by the driver.

In particular, in at least one disclosed embodiment of the process the warning message is output by means of a display on the center console of the vehicle. This display is utilized in many vehicles for indicating information about the operation of the vehicle and its devices. For example, information pertaining to the navigation system and the radio can be output via this indication. In combination with a touch-sensitive surface, so-called touch-screens can also be utilized for the input of data, for instance for the navigation system. In many driving situations such a display attracts the attention of the driver to itself, for instance if he/she is looking at a map indicated by the navigation system, and is therefore suitable for indicating the warning message.

In a further disclosed embodiment, the warning message is indicated by means of a field-of-view indication. In the case of a field-of-view indication, information is projected into the field of view of the driver. Particularly in the case of so-called heads-up displays, information can be presented to the driver while he/she is looking in the direction of travel. Once the driver has directed his/her gaze in the direction of travel, as a rule no other display is located in his/her field of vision. In this case the indication in the field-of-view indication ensures that the warning message can be registered quickly.

Analogously, smart glasses can be used for indicating the warning message, to indicate information in the field of view of the driver. In this case, visual representations are indicated, for instance on a video screen close to the eyes, or are projected into an eye of the wearer of the glasses. Since the glasses have been fastened to the head, they move together with the head of the driver, so a warning message indicated here is located in the field of view, regardless of the position and direction of the head, and can be registered by the driver.

In at least one disclosed embodiment, the warning message is output so as to be acoustically perceptible by means of a telephone or a media-player unit. The acoustically perceptible output of a warning message, for instance as a warning tone or voice message, permits the driver to register the warning quickly and reliably, even if his/her attention is not directed onto a display. This is the case, in particular, when the driver has directed his/her gaze onto a region without displays, when he/she, for example, is looking to the side in the course of parking and is unable to register an obstacle behind the vehicle. If an acoustic output unit is presently being utilized, the attention of the driver is also directed towards it. If, for example, the hands-free headset of a telephone is active, an acoustic warning that has been output via the output unit of the hands-free headset can be registered quickly. Similarly, a driver who, for example, is listening to an audio recording via a media-player unit is able to register well a warning message that has been output via this unit.

In at least one disclosed embodiment, the warning message is output as a braking jerk or vibration. This haptically perceptible output is, in particular, when no indication apparatus is located in the field of vision of the driver. In this way, the attention of the driver is called quickly and reliably to the fact that a particular situation is to be noted. Particularly when the driver-assistance system carries out a braking action, the driver can be forewarned at short notice by a braking jerk, since in the event of a jerk he/she intuitively prepares himself/herself for further braking.

In at least one disclosed embodiment of the process, the capture unit captures physiological characteristics of the driver. In this case the output signal is generated as a function of the physiological characteristics of the driver. For example, the frequency of blinking can be captured with the aid of a camera. If signs of fatigue or an otherwise diminished attentiveness of the driver are evident, the warning message can, for example, be output by means of a combination of output devices, for instance as a graphical representation with simultaneous warning tone. In this way, it is ensured that the driver registers the warning message as quickly as possible, even though his/her attentiveness is limited. Another physiological characteristic may be the pulse-rate of the driver, which likewise permits inferences as to the attentiveness of the driver.

The aforementioned system for adaptive output of a warning message in a vehicle with at least one output unit, wherein a warning signal for output of a warning message can be generated by means of a driver-assistance system of the vehicle, wherein that data about the direction of attention of the driver of the vehicle can be captured by means of at least one capture unit. By means of a control unit, an output signal can be generated as a function of the data about the direction of attention of the driver in such a way that the warning message can be output by means of the at least one output unit. The disclosed system is designed, in particular, to implement the disclosed process that was described hereinabove.

In the following, on the basis of FIG. 1 at least one disclosed embodiment of the vehicle 1 will be described which includes a system by which the disclosed process is implemented.

The vehicle 1 includes two output devices: a first display 21 on the center console of the vehicle 1, and a second display 22 in the instrument cluster. Furthermore, the vehicle 1 includes a camera 8 which captures the head of the driver 10 and permits the determination of his/her line of sight. Furthermore, the vehicle 1 includes a driver-assistance system 7. The capture unit 8, the displays 21 and 22 and also the driver-assistance system 7 have been coupled with a control unit 9.

The driver-assistance system 7 generates a warning signal and transmits it to the control unit 9. The camera 8 captures the position and the direction of the head of the driver 10 and ascertains therefrom his/her direction of attention, and transmits these data to the control unit 9. The control unit 9 generates an output signal in such a way that a warning message is indicated by means of at least one of the two displays 21 and 22. The output signal is dependent on the direction of attention of the driver 10 and is generated in such a way that display 21 or 22 which was chosen for indicating the warning message is located in the field of vision of the driver 10.

If the driver 10 is directing his/her gaze onto the first display 21 on the center console, the warning message is indicated there. If, on the other hand, he/she is directing his/her gaze forwards in the direction of travel, the warning message is indicated on the second display 22 in the instrument cluster.

In a further exemplary embodiment, the capture unit 8 captures the approach of the driver 10 to a control element that has been assigned to the first display 21 on the center console. In the exemplary case, this is the touch-sensitive surface of display 21. If such an approach takes place, a manipulating intention of the driver 10 is inferred, and the warning message is indicated on the first display 21 on the center console. If the driver 10 is not directing his/her attention onto the center console, the warning is indicated on the second display 22 in the instrument cluster.

In a further disclosed embodiment, the vehicle 1 includes precisely one output unit, namely the display 21 on the center console. On the basis of the data captured by the camera 8, it is determined whether the gaze of the driver is directed onto the display 21. If this is the case, the warning message is indicated on the display 21; otherwise the output does not take place. Alternatively, the direction of attention of the driver 10 is captured by a proximity sensor, and the message is indicated by means of the display 21 if the hand of the driver 10 approaches a control element on the center console.

Figure 2:
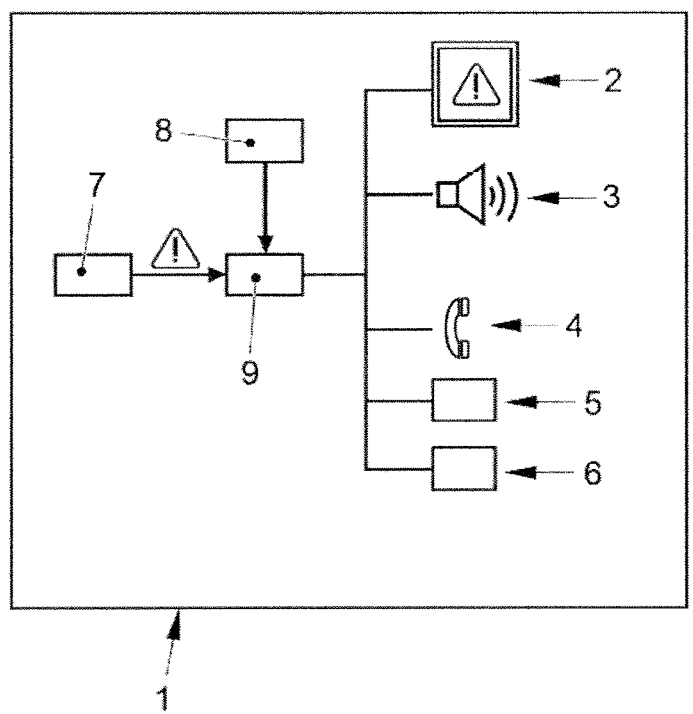
FIG. 2 shows schematically an exemplary configuration of the disclosed process.

At least one disclosed embodiment of the process will be elucidated with reference to FIG. 2.

The configuration of the disclosed process represented schematically in FIG. 2 is realized in the vehicle 1 represented in FIG. 1. The driver-assistance system 7 generates a warning signal for output of a warning message. This warning signal is transmitted to the control unit 9. Furthermore, data about the direction of attention of the driver 10 are captured by the capture unit 8 and transmitted to the control unit 9.

In this case the capture unit 8 comprises the camera 8 which captures the head of the driver 10, and from the image data thereof the line of sight of the driver 10 is ascertained. The direction of attention of the driver 10 is in this case equated with the line of sight. On the basis of the line of sight, it can be ascertained which spatial regions the driver 10 has a clear view of, and which devices of the vehicle 1 are located in his/her field of vision.

The camera 8 captures movements of the driver 10, in particular of his/her hand. If the hand of the driver 10 approaches an operating device—in this case, the touch-sensitive surface of the video screen 2—it is inferred from this that the attention of the driver 10 is directed onto the video screen 2 and onto the devices of the vehicle 1 that are capable of being operated by means of the touch-sensitive surface. The capture unit 8 further includes a proximity sensor realized as a light-barrier, which, in addition to the camera 8, captures the approach of the driver 10 to the video screen 2.

In addition, the capture unit 8 includes a sensor for registering the pulse-rate and also the blinking of the driver 10. On the basis of these data, the attentiveness of the driver 10 is assessed, and fatigue phenomena are recognized.

The control unit 9 generates, as a function of the data about the direction of attention of the driver 10, an output signal for output of the warning message by means of at least one of the output units 2 to 6. The output units in this case are a video screen 2, a loudspeaker 3, a telephone 4 with hands-free device, and also the output units 5 and 6 by means of which a warning message is output so as to be haptically perceptible as a braking jerk and vibration.

The control unit 9 generates the output signal in such a way that the signal is output by at least one of the output units 2 to 6 that is registered by the attention of the driver 10. Accordingly, on the basis of the data captured by the capture unit 8 the control unit 9 assesses the direction of attention of the driver 10 and adapts the output correspondingly. If the driver 10 is directing his/her gaze onto the video screen 2, the output data are generated in such a way that a warning message is indicated on the video screen 2. In at least one disclosed embodiment, the video screen 2 includes a field-of-view indication, by which the warning message is projected directly into the field of vision of the driver. If the media player with the loudspeaker 3 is active and if a sound-recording medium is presently being played, the output signal is generated in such a way that an acoustic warning is output. A warning tone is likewise output via the hands-free headset of the telephone 4 if the driver 10 is presently telephoning. If the attention of the driver 10 is directed onto the road and if no other suitable device of the vehicle 1 is active, a haptically perceptible signal is generated, in the course of which the steering wheel vibrates and a brief braking jerk is executed.

Particularly if the driver 10 is assessed as inattentive, because the frequency of blinking and the pulse-rate point to fatigue, the warning message is output simultaneously by a combination of various output units. Depending on the warning signal, visually, acoustically and haptically perceptible warning messages are combined, and several sensory channels are utilized simultaneously. In the case of warnings with high urgency, a visually perceptible warning message is indicated simultaneously, and a warning tone is output; furthermore, in the event of an automatic retardation by the driver-assistance system 7 a prior braking jerk is generated by way of warning signal.

The warning that is output in the given case is itself also adapted to the attentiveness of the driver 10. If the video screen 2 is located at the edge of the angle of view of the driver 10, a more conspicuous indication is presented than when the gaze of the driver 10 is directed directly onto the video screen 2. In this case the indication flashes, to direct the attention of the driver 10 onto the video screen 2. The volume of the warning tone that is output acoustically is also chosen to be louder if the driver displays fatigue phenomena. Furthermore, the intensity of the haptically perceptible warnings—in this case, the intensity of the braking jerk and of the vibrations—has been adapted to the attentiveness and is less intensely pronounced if the driver 10 is directing his/her attention towards the traffic events and is not tired.

As a result of the increasing development of electronic driver-assistance systems and their integration into motor vehicles, the safety of the vehicle is being enhanced and the burden on the driver is being reduced. Examples are the anti-lock braking system, the electronic stability program and the spacing-regulated cruise control. Driver-assistance systems are able to intervene in the control of the vehicle with various degrees of automation: whereas with the lowest degree of automation merely prompts are indicated and the driver alone influences the motion of the vehicle, for instance by actuating the pedals or the steering wheel, with a higher degree the driver-assistance system intervenes supportively in devices of the vehicle. For example, the steering or the acceleration of the vehicle is influenced in the positive or negative direction. With the highest degree of automation a route is traversed substantially automatically, for example, or the locking of the wheels in the course of the braking procedure is prevented fully automatically.

With increasing degree of automation the driver-assistance system undertakes more and more automatic interventions. This is of particular significance when a critical situation is recognized and the system intervenes in the control of the vehicle. For instance, the spacing-regulated cruise control can reduce the speed of the vehicle in order to adapt the spacing to a vehicle cutting in. Furthermore, an emergency stop can be triggered, for example ahead of an obstacle suddenly appearing, or an automatic evasive maneuver can be carried out. The reaction triggered by a driver-assistance system may in these cases be effected distinctly more quickly than the driver himself/herself is able to grasp the situation and initiate countermeasures. In this connection, care has to be taken, in the interest of ride comfort and safety, to ensure that the driver is not surprised by the behavior of the vehicle and possibly reacts rashly. Therefore a warning is ordinarily output before or during the automatic intervention. The output of the warning message may, for example, be effected by a warning message in the instrument cluster of a motor vehicle, or by a warning tone.

In this connection it is to be noted that, depending on the driving situation, the attention of the driver may have been tied down in various ways, for instance, by unclear traffic events or by the manipulation of a device in the vehicle. The warning, therefore, has to be output in such a way that the driver registers it quickly, even if at this moment his/her attention is not directed directly towards the hazardous situation.

In the case of the process described in DE 10 2010 027 449 A1 an emergency braking procedure of a vehicle is triggered, in connection with which a visually, acoustically and/or haptically perceptible driver warning is output upon triggering of the emergency stop. The parameters of the following emergency stop are controlled by an influencing variable relevant to the emergency braking procedure. In particular, prior to the actual emergency stop the driver can be warned by a brief braking jerk, in the course of which parameters for the following braking action can be ascertained simultaneously, for instance information about the adhesion coefficient of the tires on the roadway.

LIST OF REFERENCE SYMBOLS 1 vehicle
2 video screen
3 loudspeaker
4 telephone
5; 6 output units
7 driver-assistance system
8 capture unit; camera
9 control unit
10 driver
21 first display
22 second display

The invention claimed is:

1. A method for adaptive output of a warning message in a vehicle with at least two output units, the method comprising:
generating a warning signal by a driver-assistance system of the vehicle for output of the warning message, and transmitting said signal to a control unit;
capturing data about the direction of attention of the driver of the vehicle by at least one capture unit, and transmitting said data to the control unit; and
generating by the control unit, as a function of the captured data about the direction of attention of the driver, an output signal for output of the warning message by at least one output unit of the at least two output units,
wherein the capture unit captures physiological characteristics of the driver including one or more of a pulse rate and a frequency of blinking to recognize fatigue phenomena, and the output signal is generated as a function of the physiological characteristics of the driver,
wherein the captured data comprises proximity of a hand of the driver of the vehicle relative to a device and the direction of attention of the driver is determined based on the proximity the hand relative to the device,
wherein the warning message in a first output unit is adapted base on the angled of view of the driver relative to the first output unit, and
wherein the warning message is output to be acoustically perceptible by a media-player unit, a second output unit, when the media-player unit is determined to be in use when a sound-recording medium is presently being played at the time of the warning message.

2. The method of claim 1, wherein the vehicle includes a plurality of output units, and the output signal is generated as a function of the data about the direction of attention of the driver so that the warning message is output by one or more output units that have been assigned to the current direction of attention of the driver.

3. The method of claim 1, wherein the warning message is output before or during an automatic intervention of the driver-assistance system in the control of the vehicle.

4. The method of claim 1, wherein the warning signal is output before or during a change of velocity by the driver-assistance system, and the output signal is generated as a function of the direction of the change of velocity.

5. The method of claim 1, wherein the captured data about the direction of attention of the driver of the vehicle include the line of sight of the driver.

6. The method of claim 1, wherein the captured data about the direction of attention of the driver of the vehicle include the operating state of at least one vehicle device.

7. The method of claim 1, wherein the capture unit captures the proximity to the device of the vehicle by a spatially resolving proximity capture.

8. The method of claim 1, wherein signals are generated by the control unit so that the warning message is output to be visually, acoustically and/or haptically perceptible.

9. The method of claim 1, wherein the warning message is indicated by a display on the center console of the vehicle.

10. The method of claim 1, wherein the warning message is indicated by a field-of-view indication.

11. The method of claim 1, wherein the warning message is output as a braking jerk or vibration, and the intensity of the braking jerk or vibration is adjusted based on the direction of attention of the driver so that the intensity is lower when the driver's attention is sensed to be towards traffic and higher when the driver's attention is not sensed to be towards traffic.

12. A system for adaptive output of a warning message in a vehicle with at least two output units, wherein a warning signal for output of the warning message is generated by a driver-assistance system of the vehicle, wherein data about the direction of attention of the driver of the vehicle is captured by at least one capture unit, and an output signal can be generated by a control unit as a function of the data about the direction of attention of the driver so that the warning message is output by at least one output unit of the at least two output units, wherein the capture unit captures physiological characteristics of the driver including one or more of a pulse rate and a frequency of blinking to recognize fatigue phenomena, and the output signal is generated as a function of the physiological characteristics of the driver, wherein at least one capture unit comprises a sensor configured to determine the location of a hand of the driver of the vehicle relative to an input apparatus and the direction of attention of the driver is determined based on the location of the hand relative to the input apparatus, wherein a warning message in at least one output unit is adapted base on the angled of view of the driver relative to a first output unit, and
wherein the warning message is output to be acoustically perceptible by a media-player unit, a second output unit, when the media-player unit is determined to be in use when a sound-recording medium is presently being played at the time of the warning message.

13. A vehicle with a system for adaptive output of a warning message in a vehicle with at least two output units, wherein a warning signal for output of the warning message is generated by a driver-assistance system of the vehicle, wherein data about the direction of attention of the driver of the vehicle is captured by at least one capture unit, and an output signal is generated by a control unit as a function of the data about the direction of attention of the driver so that the warning message is output by at least one output unit of the at least two output units, wherein the warning message is a visual output on a display and the visual output is altered on the display based the angle of the display relative to the driver, and wherein at least one capture unit comprises a sensor configured to determine the location of a hand of the driver of the vehicle relative to an input apparatus and the direction of attention of the driver is determined based on the location of the hand relative to the input apparatus, wherein the warning message in a first output unit is adapted base on the angle of view of the driver relative to the output unit, and wherein the warning message is output to be acoustically perceptible by a media-player unit, a second output unit, when the media-player unit is determined to be in use when a sound-recording medium is presently being played at the time of the warning message.

* * * * *